United States Patent [19]

Spencer

[11] Patent Number: 4,470,586

[45] Date of Patent: Sep. 11, 1984

[54] MACHINE CLAMP ROCKABLE IN T SLOT

[76] Inventor: Philip P. Spencer, 1 Edgemoor Rd., Gloucester, Mass. 01930

[21] Appl. No.: 396,830

[22] Filed: Jul. 9, 1982

[51] Int. Cl.[3] ............................................... B23Q 3/02

[52] U.S. Cl. ........................................ 269/93; 269/94; 269/238

[58] Field of Search .................................... 269/91–94, 269/237, 238, 239

[56] References Cited

U.S. PATENT DOCUMENTS

| | | | |
|---|---|---|---|
| 1,284,124 | 11/1918 | Mazier | 269/92 |
| 1,490,063 | 4/1924 | Tower | 269/238 |
| 2,400,708 | 5/1946 | Parker et al. | 269/93 |

FOREIGN PATENT DOCUMENTS

| | | | |
|---|---|---|---|
| 897474 | 3/1945 | France | 269/238 |
| 1070153 | 5/1976 | United Kingdom | 269/92 |
| 761225 | 9/1980 | U.S.S.R. | 269/238 |

*Primary Examiner*—Robert C. Watson
*Attorney, Agent, or Firm*—Pearson & Pearson

[57] ABSTRACT

An adjustable clamp for clamping a work piece in a T slot of the bed plate of a machine tool. The clamp comprises a one piece rocker body with a work engaging portion at one end to hold down a work piece. The lower center of the clamp has a fulcrum portion of less width than the T slot and pivotally connected below the bedplate which anchors the clamp thereto. The other end of the clamp has a thrust screw which enters the T slot in the bed plate. A pair of oppositely projecting studs, each with a curved upper surface, enable the clamp to rock in the T slot, when the thrust screw is tightened, to firmly lock the work piece on the bed plate.

5 Claims, 3 Drawing Figures

Fig.1.
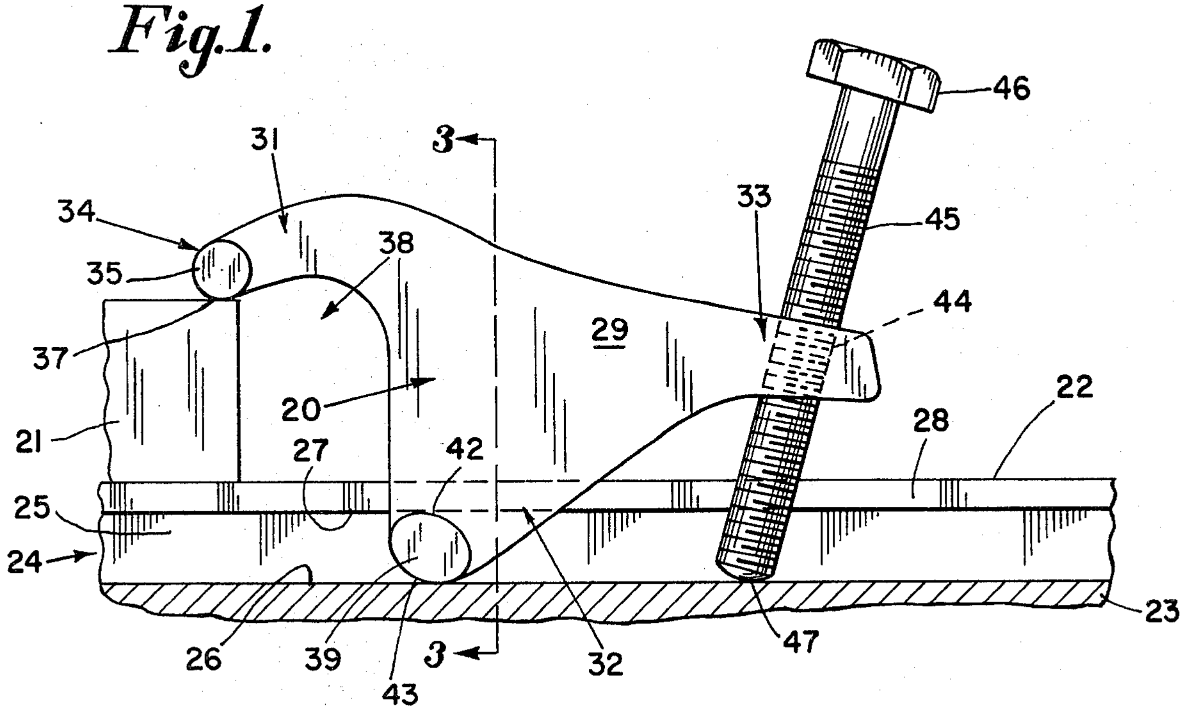
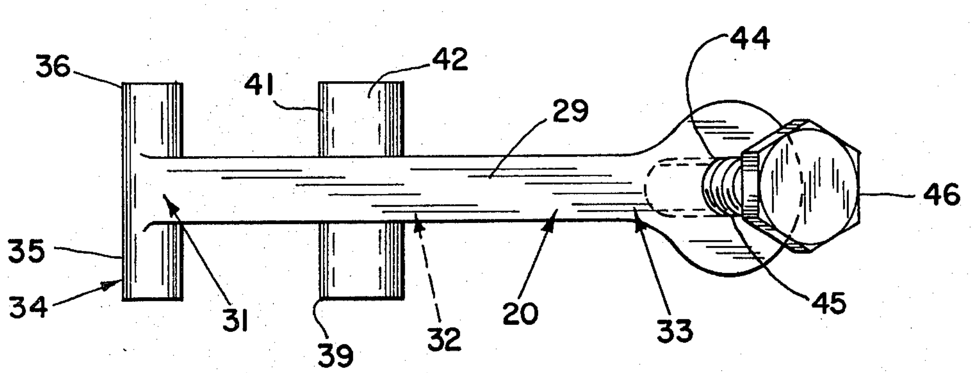
Fig.2.
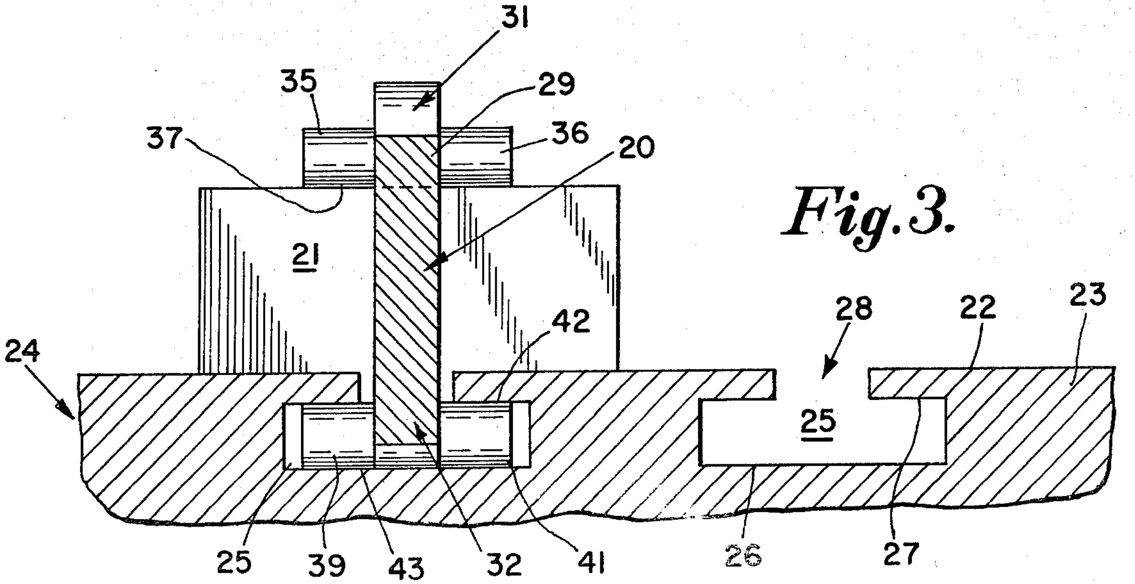
Fig.3.

MACHINE CLAMP ROCKABLE IN T SLOT

BACKGROUND OF THE INVENTION

In the art of machine tools with tool beds and specifically in the art of machine clamps, it has long been desirable to use various types of clamps to hold down a work piece on the tool bed.

This is primarily for the reason that the work pieces must be tightly secured to the bed so that precise operations may be conducted on said work piece without fear of movement after the operation has been calibrated.

There have been a number of solutions to this problem of securing work pieces by use of various types of clamps.

Exemplary of such devices are the clamps disclosed in the following patents:

U.S. Pat. No. 928,657 Howell 1909
U.S. Pat. No. 2,639,744 Herbert 1953
U.S. Pat. No. 2,913,965 Collis 1959
U.S. Pat. No. 3,210,069 Holtz 1965
U.S. Pat. No. 3,227,438 Sequin 1966

Other patents have also disclosed threaded adjustable fulcrums such as the following patents:

U.S. Pat. No. 2,994,236 McCormick
U.S. Pat. No. 2,803,277 Gamura
U.S. Pat. No. 2,487,022 LaPlaca 1949
U.S. Pat. No. 2,577,029 Moorehead 1951
U.S. Pat. No. 3,380,730 Carver 1968
U.S. Pat. No. 3,712,606 Cole 1973

In each of these patents, it has been taught that the elongated clamp body, should have the thrust screw in the center and the pivot, or fulcrum at one end.

The devices of the above patents have the disadvantage of being multiple piece units which take a great deal of time to be installed to the bed plate and secured to the work piece.

SUMMARY OF THE INVENTION

In this invention, a one piece rocker body is provided with an integral forward portion, having a recess, and a pair of integral ears of rounded cross section for engaging and holding a work piece down on the bed plate. The rocker body has a lower central portion of less width than the width of the T slot which slidably fits therewithin and is provided with a pair of laterally projecting pivot studs of rounded cross section for slidably and pivotally anchoring the clamp in the T slot. The rocker body is also provided with a thrust screw in the rearward portion and having a terminal tip which is of less diameter than the width of the T slot to enter the same and exert an upward force against the floor of the slot when tightened while also preventing sidewise movement of the rocker body in cooperation with the pivot studs in the T slot.

BRIEF DESCRIPTION OF THE DRAWING

FIG. 1 is a fragmentary, side elevation of the machine clamp of the invention slidably and pivotally mounted in the T slot of a bed plate;

FIG. 2 is a top plan view of the clamp shown in FIG. 1; and

FIG. 3 is an end elevation, from the thrust screw end of the clamp shown in FIG. 1, in section on line 3—3 of FIG. 1.

DESCRIPTION OF A PREFERRED EMBODIMENT

As shown in the drawing, the machine clamp 20 of the invention is intended for use in clamping a work piece 21 down on the surface 22 of the bed plate 23 of a machine tool 24, the bed plate having at least one conventional inverted T shaped groove, 25, termed a T slot in the art.

Each T slot 25 extends longitudinally of bed plate 23 and for convenience of description is stated to have a floor 26, a roof 27, and a slot opening 28 of predetermined width.

The machine clamp 20 is formed by a one piece elongated rocker body 29 of suitable material, such as metal, the body 29 having a forward end 31, a lower central portion 32, and a rearward end 33.

The forward end 31 includes the work piece, engaging portion 34 preferably in the form of a pair of integral ears 35 and 36, each extending laterally on one of the opposite sides thereof, and each having a lower curved face such as 37 for engaging a work piece 21. Forward end 31 also includes a recess 38 under, and in rear of, the ears 35 and 36 to receive the adjacent part of a work piece 21 while permitting the rocker body 29 to pivot.

The lower central portion 32 of rocker body 29 is of predetermined width, or thickness, less than the predetermined width of the T slot 25 to slidably and rockably fit therewithin. Portions 32 includes a pair of integral pivot studs 39 and 41 each projecting laterally on one of the opposite sides thereof and forming a pivot fulcrum within the T slot, while maintaining the clamp captive in the T slot. Preferably each stud 39 and 41 is of substantially oval cross section with a gently curved upper face 42 and a gently curved lower face 43 to contact the floor 26 or the roof 27 of the T slot and facilitate pivoting of the body 29 therein.

The rearward end 33 of rocker body 21 includes a threaded hole 44 for a threaded thrust screw 45 having a hex, or similar, head 46 by which it may be manually loosened or tightened. Thrust screw 45 has a terminal tip 47 which is of predetermined diameter less than the width of T slot 25 so that it fits therewithin to contact the floor 26 of the T slot in the bed plate 23.

It will be seen that in operation, the clamp 20 is used by first slidably inserting the pivot studs 39 and 41 in the T slot of a bed plate and then applying the curved under faces 37 of ears 35 and 36 to the work piece 21. The terminal tip 47 of the thrust screw 45 is then slidably fitted in the T slot and the head 46 turned to raise the rearward end 33 of the rocker body by exerting a force against the floor of the slot in the bed plate. This lowers the work engaging portion 34 of the body 29 to apply downward pressure thereon and firmly clamp the work piece 21 onto the surface 21 of the bed plate 23.

I claim:

1. A machine clamp for clamping a work piece on the surface of a bed plate of a machine tool, the bed plate having at least one T slot, with a floor and a roof, extending therealong, said clamp comprising:
  - a one piece, elongated, rocker body having a lower central portion of predetermined width less than the width of said T slot to fit therewithin, having a forward end and a rearward end;
  - a work piece engaging portion at said forward end of said body adapted to hold a work piece down on said surface;

a pivot fulcrum in said lower central portion of said body, slidably and pivotally fitting in and captive in said T slot to rockably anchor said body therein; and an adjusting screw, threaded in said rearward end of said body, said screw having a terminal tip in contact with said bed plate and arranged to cause said work piece engaging portion to clamp said work piece onto said surface when said screw is tightened;

said pivot fulcrum comprising a pair of laterally projecting studs, each of oval cross section with a gently curved upper face for engaging the roof of said T slot and a gently curved lower face for engaging the floor of said T slot.

2. A machine clamp as specified in claim 1 wherein:

said work engaging portion of said one piece body includes a pair of laterally extending, integral ears, each on one of the opposite sides thereof, and each having a lower, curved face for engaging a work piece.

3. A machine clamp as specified in claim 1 wherein:

the end of said one piece elongated rocker body, containing said work piece engaging portion, includes a recess below said work engaging portion for receiving the adjacent part of said work piece.

4. A machine clamp as specified in claim 1 wherein:

the terminal tip of said adjusting screw is of predetermined diameter less than the width of the T slot in said bed plate, said terminal tip being in contact with the floor of said T slot and preventing side wise movement of said clamp on said bed plate in cooperation with said pivot fulcrum.

5. A machine clamp for holding a work piece down on the T slotted bed plate of a machine tool, said clamp comprising:

an elongated body having a lower, central portion fitting in the T slot of said bed plate, having a pair of laterally projecting studs slidable and pivotally captive in said T slot, having a forward end and having a rearward end;

a work engaging portion at said forward end; and a thrust screw, threaded in said rearward end, said thrust screw having a terminal, lower tip fitting in said T slot of said bed plate;

said laterally projecting studs being of oval cross section, with a gently curved upper face and a gently curved lower face for rockable pivoting in said T slot.

* * * * *